(12) United States Patent
Marschall

(10) Patent No.: US 9,300,173 B2
(45) Date of Patent: Mar. 29, 2016

(54) STATOR OF AN ELECTRICAL MACHINE

(75) Inventor: Peter Marschall, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 270 days.

(21) Appl. No.: 13/817,420

(22) PCT Filed: Jul. 19, 2011

(86) PCT No.: PCT/EP2011/062372
§ 371 (c)(1),
(2), (4) Date: Apr. 11, 2013

(87) PCT Pub. No.: WO2012/022566
PCT Pub. Date: Feb. 23, 2012

(65) Prior Publication Data
US 2013/0193799 A1 Aug. 1, 2013

(30) Foreign Application Priority Data

Aug. 17, 2010 (DE) .......................... 10 2010 039 393
Oct. 20, 2010 (DE) .......................... 10 2010 042 663
Dec. 16, 2010 (DE) .......................... 10 2010 063 304

(51) Int. Cl.
*H02K 1/18* (2006.01)
*H02K 3/52* (2006.01)

(52) U.S. Cl.
CPC .................. *H02K 1/18* (2013.01); *H02K 3/522* (2013.01); *H02K 2203/06* (2013.01)

(58) Field of Classification Search
CPC ........... H02K 3/32; H02K 3/325; H02K 3/34; H02K 3/345; H02K 3/38; H02K 3/50; H02K 3/52; H02K 3/521; H02K 3/522; H02K 1/14; H02K 2203/12; H02K 1/18; H02K 2203/06; H02K 3/54; H02K 2203/00
USPC ...... 310/71, 214, 260, 208, 254.1, 68 R, 215, 310/216.005, 400, 410, 411, 416, 49
See application file for complete search history.

(56) References Cited

U.S. PATENT DOCUMENTS

| 2,442,754 A | * | 6/1948 | Beam ........................... 248/27.1 |
| 2,688,103 A | * | 8/1954 | Sheldon ................. 310/216.057 |
| 3,458,928 A | * | 8/1969 | Staebler et al. ................. 29/605 |
| 3,940,648 A | * | 2/1976 | Wielt et al. ............ 310/216.131 |
| 4,284,920 A | * | 8/1981 | Nelson .......................... 310/432 |
| 4,633,114 A | | 12/1986 | Reynolds |
| 4,765,054 A | * | 8/1988 | Sauerwein ............. H02K 1/185 29/596 |
| 4,874,977 A | * | 10/1989 | Safranek ...................... 310/269 |

(Continued)

FOREIGN PATENT DOCUMENTS

| CN | 1550057 | 11/2004 |
| DE | 202 04 507 | 3/2002 |

(Continued)

*Primary Examiner* — Dang Le
(74) *Attorney, Agent, or Firm* — Kenyon & Kenyon LLP

(57) ABSTRACT

Stator of an electrical machine includes a stator lamination stack, having coil forms fastened thereto which each include an electrical coil. The coil forms are each pressed onto a tooth of the stator lamination stack. For the fastening of the coil forms to the teeth of the stator lamination stack, at least one fastening element is provided at the two end faces of the stator lamination stack, which fastening element includes a fastening arrangement which cooperate in a form-locking manner and/or force-locking with coil forms.

10 Claims, 3 Drawing Sheets

(56) References Cited

U.S. PATENT DOCUMENTS

| | | | |
|---|---|---|---|
| 6,952,065 B2 * | 10/2005 | Park et al. | 310/216.067 |
| 7,768,375 B2 * | 8/2010 | Grott et al. | 336/234 |
| 2001/0048262 A1 * | 12/2001 | Takano et al. | 310/179 |
| 2007/0040467 A1 * | 2/2007 | Gu | 310/216 |
| 2007/0241630 A1 * | 10/2007 | Holmes et al. | 310/217 |
| 2009/0127972 A1 * | 5/2009 | Ishida et al. | 310/218 |
| 2009/0140599 A1 * | 6/2009 | Yoshiyama et al. | 310/217 |
| 2009/0256439 A1 * | 10/2009 | Inoue et al. | 310/71 |
| 2011/0210640 A1 * | 9/2011 | Elser | 310/208 |

FOREIGN PATENT DOCUMENTS

| | | | |
|---|---|---|---|
| DE | 10 2007 038 988 | 2/2009 | |
| DE | 10 2009 023 231 | 12/2010 | |
| JP | 4 017 541 | 1/1992 | |
| WO | WO 2009024494 A1 * | 2/2009 | H02K 3/52 |

* cited by examiner

STATOR OF AN ELECTRICAL MACHINE

BACKGROUND OF THE INVENTION

1. Field of the Invention

The present invention relates to a stator of an electrical machine.

2. Description of the Related Art

U.S. Patent Application publication U.S. 2009/0140599 A1 already describes a stator of an electrical machine that has a stator lamination stack having coil forms fastened thereto, which each include an electrical coil. The coil forms are each pressed onto a tooth of the stator lamination stack, convex protuberances, which generate the dynamic compression, being provided on the teeth of the stator lamination stack. The inherent drawback here, however, is that the convex protuberances are expensive to manufacture. Moreover, the convex protuberances produce an increased mechanical load on the coil forms which can cause microcracks to form on the coil form and, thus, lead to an electric breakdown.

BRIEF SUMMARY OF THE INVENTION

Against this background, it is an advantage of the inventive stator of an electrical machine having the characterizing features of the main claim that no mechanical loading of the coil form occurs by the fastening of the same to the stator lamination stack, in that a fastening element is provided at each of the two end faces of the stator lamination stack that includes fastening means which cooperate in a form-locking manner and/or in a force-locking manner with the coil forms.

It is particularly advantageous that the fastening element be configured in lamellar form since this permits an installation-space saving design of the fastening.

It is also advantageous that the fastening element be made of an electrically insulating material, in particular plastic, since this allows the stator lamination stack to be readily insulated from a wiring harness of an electrical phase that is routed closely along the stator lamination stack. Moreover, if properly configured, a latching connection is re-releasable, and disassembly is made possible without any sign of wear on the components. In the event of damage to the coils or the interconnections, stators may be thereby repaired prior to the impregnation process without any loss in added value.

It is very advantageous in each case when the connection between the fastening element and the coil form is a latching connection which includes a latching spring and a locking hook, since a latching connection makes possible a very simple assembly of the coil form on the stator lamination stack. This reduces the costs of manufacturing the stator.

It is advantageous when the latching spring is provided on the fastening element and the locking hook on the coil form since the elastically resilient latching spring may be more easily implemented on a separate component than on a composite part, such as the wound coil or the stator lamination stack.

Moreover, it is advantageous that the fastening element have radially inwardly projecting clips which feature at least one latching spring or at least one locking hook, since this allows the clips to project into the coil form and form a latching connection therewith.

Moreover, it is advantageous that the inner periphery of the fastening element facing the coil form have a polygonal design, the clips being provided at the inner polygonal periphery, since this allows the slipped-on coil form to come to rest flush against the fastening element and the stator lamination stack, and eliminates the need for configuring an arcuate form on the coil form.

Moreover, it is advantageous when a clip of the one fastening element on the one side, and a clip of the other fastening element on the other side project into the coil form, the coil form having a locking hook in each case at the inner sides thereof facing the clips. The coil form is thereby reliably fastened at each end face of the stator lamination stack to a latching connection.

Moreover, it is advantageous that the fastening element include at least one projecting pin that cooperates in a form-locking manner with the stator lamination stack, since this allows the fastening element to be aligned with the circumferential position. In each instance, the pin engages in a respective bore or groove of the stator lamination stack.

DETAILED DESCRIPTION OF THE INVENTION

Figure 1:
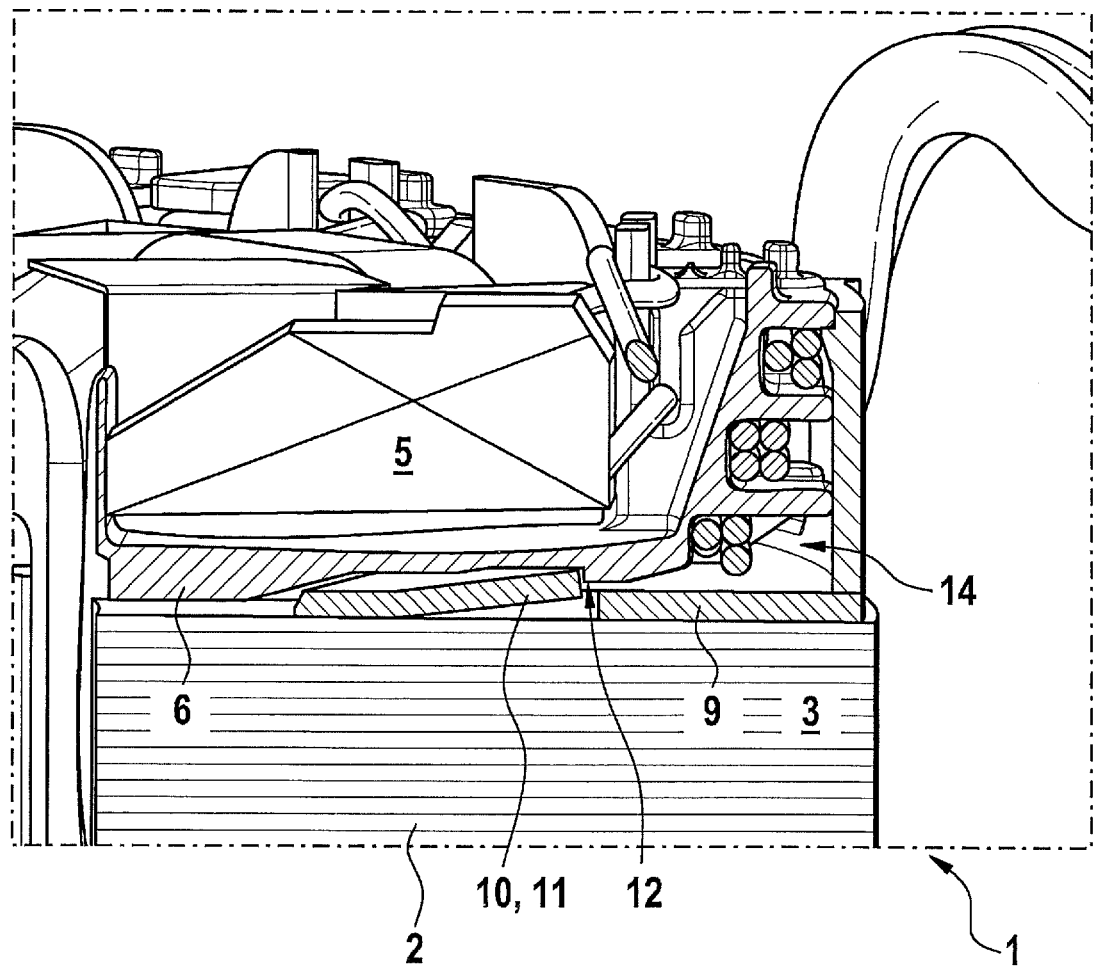
FIG. 1 shows a sectional view of the stator according to the present invention.

FIG. 1 shows a partial cross-sectional view of the stator according to the present invention.

Stator 1 is part of an electrical machine, in particular an electrical motor or generator, and includes a stator lamination stack 2 of superimposed magnetic steel sheets. Stator lamination stack 2 has a rim of teeth 3 between which interspaces, respectively grooves 4 are configured. On teeth 3, electrical coils 5 are provided as what are generally referred to as individual tooth coils, which, when energized, generate a magnetic field. On each of coil forms 6, electrical coils 5 are provided that are fitted onto teeth 3 and include a receptacle for an electrical coil 5. By the windings thereof, electrical coils 5 surround teeth 3 and at least partially fill grooves 4.

At each of the two end faces of cylindrical stator lamination stack 2, the present invention provides for a fastening element 9 that is mechanically connected to stator lamination stack 2 and includes fastening means 10 that cooperate in a form-locking manner and/or in a force-locking manner with coil forms 6.

Fastening element 9 is configured to have a lamellar or flat band form, for example, and has a flat rectangular cross section. In accordance with the exemplary embodiment, fastening element 9 is made of an electrically insulating material, in particular plastic, for example, polyphenylene sulfide (PPS). Stator lamination stack 2 is thereby readily electrically insulated from an electrical connection 14 of an electrical phase of the electrical machine that is routed closely along stator lamination stack 2. Electrical connection 14 is constituted of a wiring harness composed of a plurality of wires, for example, that are connected to one of electrical coils 5 and of the electrical phase associated therewith.

However, connection 14 may also be a rail-type or other electrical connection. Alternatively, fastening element 8 may also be fabricated from an electrically conductive material, for example, metal, when stator lamination stack 2 is insulated from electrical connection 14 in some way other than by fastening element 9.

In accordance with the exemplary embodiment, the connection between fastening elements 9 and coil form 6 is a latching connection which includes a latching spring 11 and a locking hook 12. A locking hook 12 is understood to be a rigid undercut behind which latching spring 11 is deflected and/or snaps into place with form locking, the connection being thereby closed.

As in the exemplary embodiment, latching spring 11 may be provided at fastening element 9, and locking hook 12 on coil form 6, or also vice versa, however. Fastening element 9 has radially inwardly projecting clips 15 on each of which a latching spring 11 is configured, as in the exemplary embodiment, but which may also include a locking hook 12. Clips 15 are formed by a cantilevered segment 16, which has a recess 17 into which latching springs 11 project in a tongue-like manner. Latching spring 11 is integrally formed in one piece with segment 16. Instead of tongue-shaped latching springs 11, arcuate protuberances, which also project in the direction of locking hooks 12, and may also be referred to as catch bosses, and cooperate in a form-locking manner with locking hook 12, may also be provided on clips 15. The protuberances are impressed by a stamping process, for example, in that a slot extending transversely to the radial direction is introduced into the material of the clip, and the material is reshaped, forming a protuberance, contiguously to the slot. The catch bosses are advantageously capable of transmitting very high forces.

The inner periphery of fastening element 9 facing coil form 6 has a polygonal design, the clips being provided at the inner polygonal periphery, for example, in each instance in the middle of the edges.

One clip 15 of the one fastening element 9 at the one end face and one clip 15 of the other fastening element 9 at the other end face of stator lamination stack 2 project in each instance into a coil form 6, the coil form having a locking hook at each of the inner sides thereof facing the clips.

Fastening elements 9 are connected in a form-locking manner, in a force-locking manner, and/or by a substance-to-substance bond to stator lamination stack 2. In accordance with the exemplary embodiment, fastening elements 9 each have at least one projecting pin 18, for example, three pins 18, that cooperate in a form-locking manner with stator lamination stack 2. In accordance with the exemplary embodiment, pins 18 achieve only one radial positive engagement, so that fastening elements 9 are fixed radially relative to stator lamination stack 2 and are not displaceable. Fastening elements 9 rest loosely unattached against the end face of stator lamination stack 2 in the axial direction relative thereto.

Figure 2:
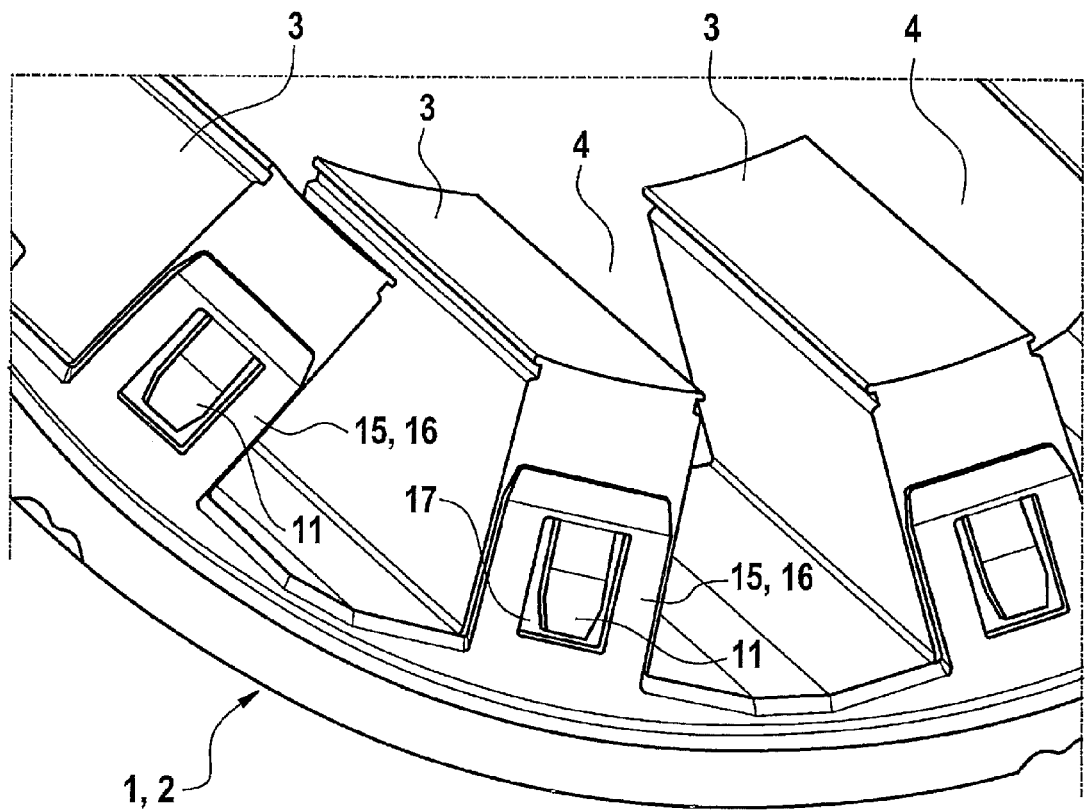
FIG. 2 shows a partial view of the stator lamination stack including a fastening element according to the present invention.
Figure 3:
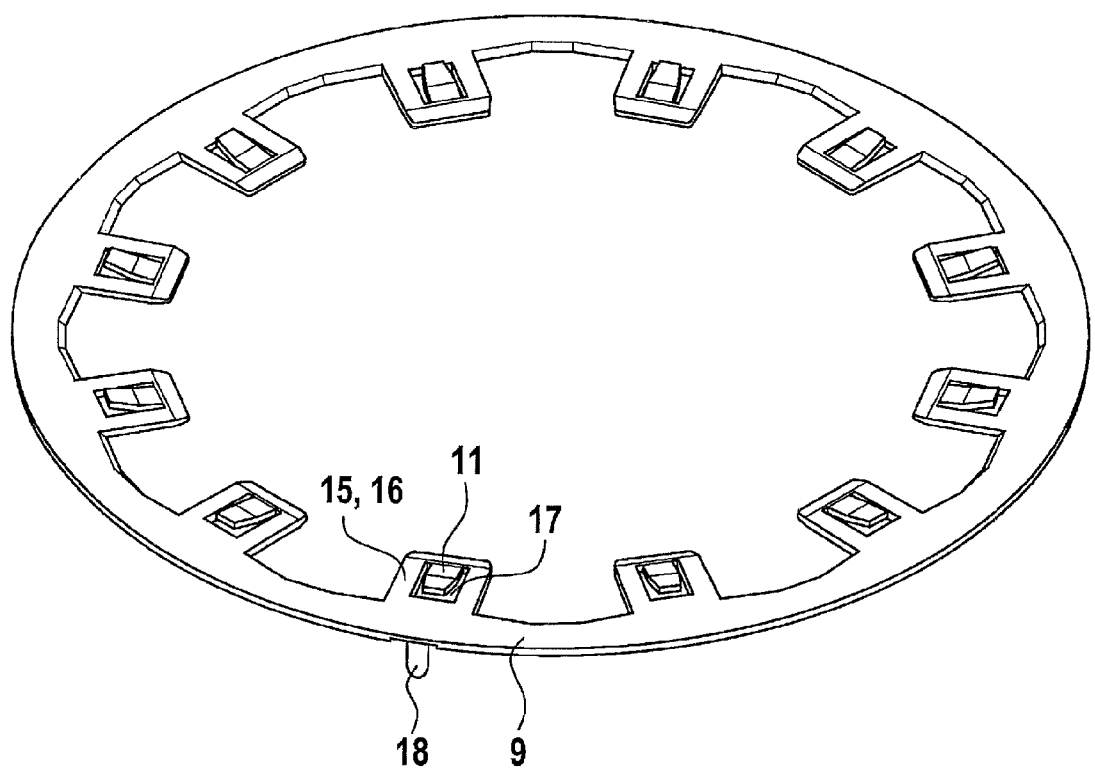
FIG. 3 shows a view of the fastening element according to the present invention.

Alternatively to the exemplary embodiment according to FIG. 1 through 3, fastening element 8 may also be formed of the uppermost, respectively lowermost steel sheet of stator lamination stack 2; as fastening means 10, the uppermost and lowermost steel sheet of stator lamination stack 2 having a recess at each tooth 3 which, in each case, forms an undercut and cooperates in a form-locking manner with a latching spring 11 configured on coil form 6. This second exemplary embodiment (not shown) eliminates the need for an additional lamellar fastening element 9, as in accordance with FIG. 1 through 3.

FIG. 2 shows a partial view of the stator lamination stack including the fastening element according to the present invention. In the view according to FIG. 2, equivalent parts and parts performing equivalent functions as in the view according to FIG. 1, are denoted by the same reference numerals.

FIG. 3 shows a view of the fastening element according to the present invention. In the view according to FIG. 3, equivalent parts and parts performing equivalent functions as in the view according to FIG. 1 and FIG. 2, are denoted by the same reference numerals.

What is claimed is:

1. A stator of an electrical machine, comprising:
   a stator lamination stack that forms a plurality of teeth arranged side-by-side in a ring, wherein, with respect to each of the teeth, the respective tooth includes (a) two side faces that each faces a side face of another one of the teeth that is adjacent to the respective tooth, (b) a top face, and (c) a bottom face, wherein the top faces of all the teeth together form a flat plane defining a top end face of the stator lamination stack, and the bottom faces of all the teeth together form a flat plane defining a bottom end face of the—stator lamination stack;
   coil bobbins fastened to the teeth of the stator lamination stack, wherein each coil bobbin includes an inner surface surrounding one of the teeth and an outer surface onto which an electrical coil is wound; and
   at least one fastening element provided at each of the top and bottom end faces of the stator lamination stack, wherein the at least one fastening element includes radially inwardly projecting lugs, which each (a) includes a latching spring or a locking hook, and (b) cooperates in at least one of a form-locking manner and a force-locking manner with the inner surface of one of the coil bobbins.

2. The stator as recited in claim 1, wherein the fastening element is one of ring-shaped, circular segment-shaped, or arcuate.

3. The stator as recited in claim 1, wherein the fastening element has one of a lamellar or flat band form.

4. The stator as recited in claim 3, wherein the fastening element is made of an electrically insulating material.

5. The stator as recited in claim 1, wherein a latching connection is provided between the fastening element and the coil bobbins, wherein the latching connection is achieved by cooperation of the latching spring and the locking hook.

6. The stator as recited in claim 5, wherein the latching spring is provided on the fastening element and the locking hook is provided on the coil bobbins.

7. The stator as recited in claim 6, wherein the fastening element is ring-shaped, circular segment-shaped, or arcuate, and an inner periphery of the fastening element facing the coil bobbins has a polygonal configuration, and wherein the radially inwardly projecting lugs are provided at the inner polygonal periphery.

8. The stator as recited in claim 6, wherein the lugs of one fastening element at one end face of the stator lamination and the lugs of the other fastening element at the other end face of the stator lamination stack project into respective coil bobbins each having a locking hook at the inner side of coil bobbins facing the lugs.

9. The stator as recited in claim 1, wherein the fastening element has projecting pins which cooperate in a form-locking manner with the top end face or the bottom end face of the stator lamination stack.

10. The stator as recited in claim 1, wherein the lugs protrude either upwards from the top end face of the stator lamination stack or downwards from the bottom end face of the stator lamination stack.

* * * * *